(12) United States Patent
Wu

(10) Patent No.: US 12,120,562 B2
(45) Date of Patent: Oct. 15, 2024

(54) DETERMINING METHOD AND DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 456 days.

(21) Appl. No.: 17/395,449

(22) Filed: Aug. 5, 2021

(65) Prior Publication Data

US 2021/0368403 A1 Nov. 25, 2021

Related U.S. Application Data

(63) Continuation of application No. PCT/CN2020/074880, filed on Feb. 12, 2020.

(30) Foreign Application Priority Data

Feb. 14, 2019 (CN) .......................... 201910114992.3

(51) Int. Cl.
*H04W 72/04* (2023.01)
*H04W 36/00* (2009.01)
(Continued)

(52) U.S. Cl.
CPC ... *H04W 36/0069* (2018.08); *H04W 36/0058* (2018.08); *H04W 36/32* (2013.01); *H04W 74/0833* (2013.01); *H04W 76/30* (2018.02)

(58) Field of Classification Search
CPC ............. H04W 24/08; H04W 36/0058; H04W 36/0069; H04W 36/0079; H04W 36/32;
(Continued)

(56) References Cited

U.S. PATENT DOCUMENTS

2009/0176494 A1* 7/2009 Lee .................. H04W 36/0079
455/436
2009/0215459 A1* 8/2009 Kuo .................... H04W 74/002
455/436

(Continued)

FOREIGN PATENT DOCUMENTS

| CN | 103929828 A | 7/2014 |
|---|---|---|
| CN | 106413008 A | 2/2017 |

(Continued)

OTHER PUBLICATIONS

International Search Report issued in corresponding International Application No. PCT/CN2020/074880, mailed May 11, 2020, 4 pages.

(Continued)

*Primary Examiner* — Phuc H Tran
(74) *Attorney, Agent, or Firm* — IPX PLLC

(57) ABSTRACT

Embodiments of the present disclosure relate to the field of communications technologies, and provide a determining method and device, to resolve a problem in the related art that user equipment (UE) fails to process a UE connection failure in a dual-connectivity moving process. The method includes determining, when a first timer expires, that a dual-connectivity moving process of a terminal device fails.

17 Claims, 2 Drawing Sheets

(51) Int. Cl.
  *H04W 36/32*   (2009.01)
  *H04W 74/0833* (2024.01)
  *H04W 76/30*   (2018.01)

(58) Field of Classification Search
  CPC . H04W 74/0833; H04W 76/15; H04W 76/19;
                                      H04W 76/30
  See application file for complete search history.

(56) References Cited

U.S. PATENT DOCUMENTS

| | | | | |
|---|---|---|---|---|
| 2011/0058529 | A1* | 3/2011 | Uemura | H04W 36/0077 |
| | | | | 370/331 |
| 2012/0170532 | A1* | 7/2012 | Kato | H04W 36/0072 |
| | | | | 370/329 |
| 2014/0321263 | A1 | 10/2014 | Wu | |
| 2016/0295613 | A1 | 10/2016 | Wager et al. | |
| 2016/0302256 | A1 | 10/2016 | Susitaival et al. | |
| 2017/0311185 | A1 | 10/2017 | Yamada et al. | |
| 2020/0154333 | A1* | 5/2020 | Paladugu | H04B 7/0602 |
| 2020/0305216 | A1* | 9/2020 | Kim | H04W 76/19 |

FOREIGN PATENT DOCUMENTS

| | | | |
|---|---|---|---|
| CN | 107079514 A | 8/2017 | |
| CN | 107690162 A | 2/2018 | |
| CN | 107872851 A | 4/2018 | |
| CN | 107889130 A | 4/2018 | |
| CN | 107889172 A | 4/2018 | |
| WO | WO-2014012454 A1 * | 1/2014 | ........ H04W 36/0079 |

OTHER PUBLICATIONS

First Office Action issued in related Chinese application No. 01910114992.3, mailed Mar. 1, 2021, 12 pages.

* cited by examiner

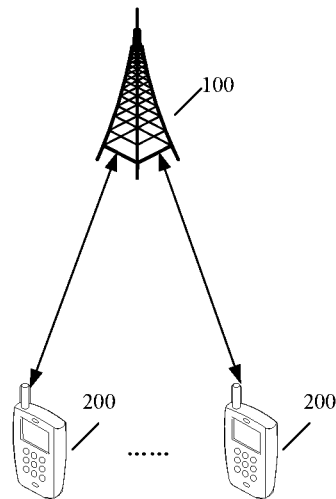
FIG. 1
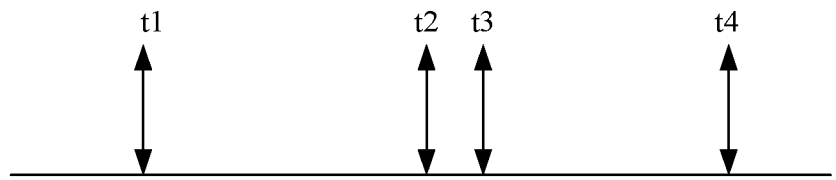
FIG. 2
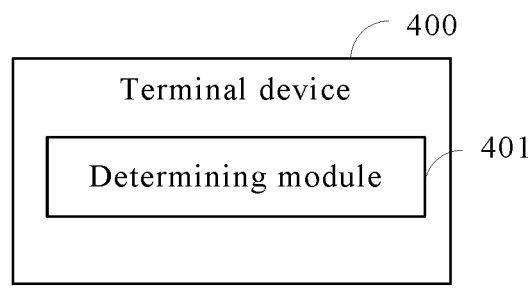
FIG. 3
FIG. 4

DETERMINING METHOD AND DEVICE

This application is a bypass continuation of PCT Application No. PCT/CN2020/074880 filed Feb. 12, 2020, which claims priority to Chinese Patent Application No. 201910114992.3, filed with the China National Intellectual Property Administration on Feb. 14, 2019, both of which are incorporated herein by reference in their entireties.

TECHNICAL FIELD

Embodiments of the present disclosure relate to the field of communications technologies, and in particular, to a determining method and device.

BACKGROUND

Dual connectivity means that UE may establish connections to two cell groups (namely, a master cell group (MCG) and a secondary cell group (SCG)) at a time. The MCG includes a primary cell (PCell) and a secondary cell (SCell). The SCG includes a primary secondary cell (PSCell) and an SCell. Both "PCell" and "PSCell" may also be referred to as "special cell" (SpCell).

In a dual-connectivity moving process, the UE may establish connections to both a source cell and a target cell at a time. Then, the UE may release the connection to the source cell, and retain only the connection to the target cell.

However, currently, the UE has no effective detection solution for connection failures of the UE in a dual-connectivity moving process.

SUMMARY

Embodiments of the present disclosure provide a determining method and device, to resolve a problem in the related art that UE fails to detect a UE connection failure in a dual-connectivity moving process.

To resolve the foregoing technical problem, the embodiments of the present disclosure are implemented as follows:

According to a first aspect, an embodiment of the present disclosure provides a determining method, where the method is applied to a terminal device and includes: determining, when a first timer expires, that a dual-connectivity moving process of the terminal device fails.

According to a second aspect, an embodiment of the present disclosure provides a terminal device, including: a determining module, configured to: determine, when a first timer expires, that a dual-connectivity moving process of the terminal device fails.

According to a third aspect, an embodiment of the present disclosure provides a terminal device, including a processor, a memory, and a computer program that is stored in the memory and that can run on the processor, and when the computer program is executed by the processor, steps of the determining method provided in the first aspect are implemented.

According to a fourth aspect, an embodiment of the present disclosure provides a computer-readable storage medium, where the computer-readable storage medium stores a computer program, and when the computer program is executed by a processor, steps of the foregoing determining method are implemented.

In the embodiments of the present disclosure, due to arrangement of the first timer, the terminal device can determine, when the first timer expires, that the dual-connectivity moving process of the terminal device fails, so that the terminal device can promptly resolve a connection failure problem of the terminal device, to improve communication efficiency.

BRIEF DESCRIPTION OF DRAWINGS

FIG. 1 is a possible schematic structural diagram of a communications system according to an embodiment of the present disclosure;

FIG. 2 is a schematic flowchart of a determining method according to an embodiment of the present disclosure;

FIG. 3 is a schematic diagram of a time axis of a dual-connectivity moving process according to an embodiment of the present disclosure;

FIG. 4 is a first schematic structural diagram of a terminal device according to an embodiment of the present disclosure;

DETAILED DESCRIPTION

Figure 5:
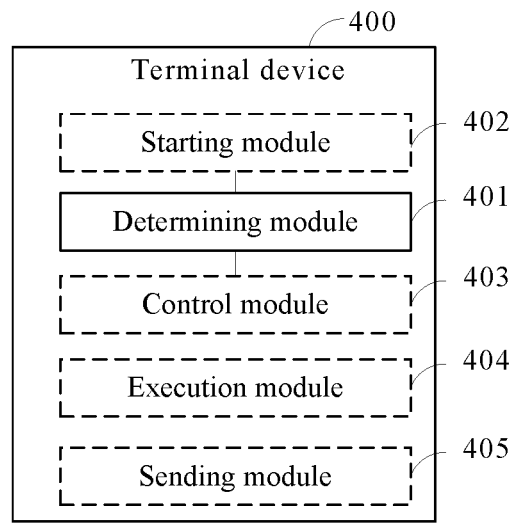
FIG. 5 is a second schematic structural diagram of a terminal device according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the embodiments of the present disclosure.

In this specification, "/" represents or. For example, AB may indicate A or B; and "and/or" is merely an association relationship that describes associated objects, and indicates that there may be three relationships. For example, A and/or B may represent three cases: only A exists, both A and B exist, and only B exists.

For ease of clearly describing the technical solutions in the embodiments of this application, in the embodiments of this application, the words "first" and "second" are used to distinguish between same or similar items with basically the same functions or effects. A person skilled in the art may understand that the words "first" and "second" do not limit a quantity and an execution sequence. For example, a first timer and a second timer are used to distinguish between different timers, but are not used to describe a particular sequence of the timers.

In this specification, the term such as "exemplary" or "for example" is used to indicate an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner. In this specification, "of", "relevant", and "corresponding" may be used in a mixed manner. It should be noted that, when a difference is not emphasized, meanings to be expressed by them are the same.

In this specification, "a plurality of" means two or more.

The following describes solutions provided in this specification with reference to the accompanying drawings in combination with the foregoing description.

The technical solutions provided in the embodiments of the present disclosure may be applied to various communications systems, for example, a 5G communications system, a future evolved system, or a plurality of communications fusion systems. There may be multiple application scenarios, for example, machine-to-machine (M2M), D2M, macro-micro communication, enhanced mobile broadband (eMBB), ultra-reliable and low latency communication (uRLLC), and massive machine type communication (mMTC). These scenarios include but are not limited to scenarios such as communication between terminal devices, communication between network devices, or communication between a network device and a terminal device. The embodiments of the present disclosure may be applied to communication between a network device and a terminal device in the 5G communications system, communication between terminal devices, or communication between network devices.

FIG. 1 is a possible schematic structural diagram of a communications system according to an embodiment of the present disclosure. As shown in FIG. 1, the communications system includes at least one network device 100 (only one network device is shown in FIG. 1) and one or more terminal devices 200 connected to each network device 100.

The network device 100 may be a base station, a core network device, a transmission and reception point (TRP), a relay station, an access point, or the like. The network device 100 may be a base transceiver station (BTS) in a global system for mobile communication (GSM) or a code division multiple access (CDMA) network, may be an NB (NodeB) in wideband code division multiple access (WCDMA) system, or may be an evolutional NodeB (eNB or an eNodeB) in an LTE system. The network device 100 may also be a wireless controller in a cloud radio access network (CRAN) scenario. The network device 100 may also be a network device in the 5G communications system or a network device in a future evolved network. However, the use of words does not constitute a limitation on the embodiments of the present disclosure.

The terminal device 200 may be a wireless terminal device or a wired terminal device. The wireless terminal device may be a device that provides voice and/or other service data connectivity for a user, a handheld device with a wireless communication function, a computing device, another processing device connected to a wireless modem, an in-vehicle device, a wearable device, a terminal device in a future 5G network, a terminal device in a future evolved PLMN network, or the like. The wireless terminal device may communicate with one or more core networks by using a radio access network (RAN). The wireless terminal device may be a mobile terminal device, such as a mobile phone (or referred to as a "cellular" phone) and a computer with a mobile terminal device. For example, the wireless terminal device may be a portable, pocket-sized, handheld, computer built-in, or in-vehicle mobile apparatus that exchanges voice and/or data with a RAN, and/or a device such as a personal communication service (PCS) phone, a cordless phone, a session initiation protocol (SIP) phone, a wireless local loop (WLL) station, or a personal digital assistant (PDA). The wireless terminal device may also be a mobile device, user equipment (UE), a UE terminal device, an access terminal device, a wireless communications device, a terminal device unit, a terminal device station, a mobile station, a mobile console, a remote station, a remote terminal, a subscriber unit, a subscriber station, a user agent, a terminal device apparatus, or the like. In an example, in this embodiment of the present disclosure, a mobile phone is shown as an example of the terminal device in FIG. 1.

FIG. 2 is a schematic flowchart of a determining method according to an embodiment of the present disclosure. As shown in FIG. 2, the determining method may include the following steps.

Step 201: Determine, by a terminal device, when a first timer expires, that a dual-connectivity moving process of the terminal device fails.

In this embodiment of the present disclosure, the dual-connectivity moving process includes at least one of the following: a handover process or an SCG change process. In other words, the terminal device establishes connections to a source cell and a target cell at a time when its serving cell is changed (for example, a PCell serving cell of the terminal device is changed from a cell 1 to a cell 2 in the handover process, and the terminal device establishes connections to the cell 1 and the cell 2 at a time in the change process).

The handover process corresponding to the dual-connectivity moving process includes at least one of the following: a first process, a second process, or a third process. The first process is a connection process in which the terminal device establishes connections to the source cell and the target cell at a time (for example, the target cell is added as an SCG of dual connectivity); the second process is a change process in which the target cell is changed to an MCG (for example, the SCG is changed to an MCG, and a PSCell in the SCG is changed to a PCell); and the third process is a change process in which the source cell is changed to an SCG or the source cell is released (for example, a connection between the terminal device and the source cell is deleted, or the source cell is changed to an SCG).

The SCG change process corresponding to the dual-connectivity moving process includes at least one of the following: the first process, a fourth process, or a fifth process. The first process is a connection process in which the terminal device establishes connections to the source cell and the target cell at a time (for example, UE establishes connections to a source SCG cell and a target SCG cell at a time); the fourth process is a change process in which the target cell is changed to an SCG, that is, a process in which a serving cell of the SCG is changed into the target cell (for example, the UE retains the connection to the target SCG cell but releases the connection to the source SCG cell); and the fifth process is a change process in which the source cell is released.

In this embodiment of the present disclosure, the terminal device starts the first timer (namely, a timer (for example, t304) configured to determine whether the dual-connectivity moving process fails) in the dual-connectivity moving process. When the first timer expires, the terminal device determines that the dual-connectivity moving process fails. In an example, for the handover process of the dual-connectivity moving process, the terminal device may trigger a connection re-establishment process after determining that the handover process fails. In addition, the terminal device may also report failure information to a network side. In another example, if in the SCG change process of the dual-connectivity moving process (for example, a PSCell of an SCG changes from a cell 1 to a cell 2), the terminal device triggers an SCG failure reporting process when determining that an SCG change fails, that is, the terminal device sends SCG failure information to the network side via a connection to an MCG.

In this embodiment of the present disclosure, when determining that the first timer expires, the terminal device may perform counting up (for example, when a timing value of the first timer is greater than or equal to a predetermined threshold, the terminal device determines that the first timer expires); or may also perform counting down (for example, when a timing value of the first timer is less than or equal to 0, the terminal device determines that the first timer expires). This is not limited in this embodiment of the present disclosure.

In this embodiment of the present disclosure, the terminal device may configure two pieces of configuration information (namely, the first configuration information and the second configuration information in this specification) in the dual-connectivity moving process. The first configuration information is applied to the first process; and the second configuration information is applied to at least one of the following: the second process, the third process, the fourth process, or the fifth process.

Optionally, in this embodiment of the present disclosure, the determining method further includes the following step:

Step A1: The terminal device starts the first timer according to a first predetermined condition.

The first predetermined condition includes any one of the following: the starting is performed when the first configuration information is received, the starting is performed when the first configuration information is executed, the starting is performed when the second configuration information is received, and the starting is performed when the second configuration information is executed.

Optionally, in this embodiment of the present disclosure, the determining method further includes the following step:

Step A2: The terminal device controls, according to the second predetermined condition, the first timer to stop timing.

The second configuration information is used to indicate that the dual-connectivity moving process is completed (for example, the handover process is completed successfully; or the SCG change process is completed successfully). The second predetermined condition includes any one of the following: the timing is stopped after a random access process to the target cell is completed, the timing is stopped after a source connection is released, the timing is stopped when the second configuration information is received, the timing is stopped when the second configuration information is executed, the timing is stopped when the second process and/or the fourth process are/is completed, the timing is stopped when confirmation information for executing the second configuration information is sent, and the timing is stopped when confirmation information for executing the first configuration information is sent.

It should be noted that, for the stop timing condition "the timing is stopped when the second configuration information is received" or "the timing is stopped when the second configuration information is executed", the corresponding starting condition is "the starting is performed when the first configuration information is received" or "the starting is performed when the first configuration information is executed".

It should be noted that, the foregoing "when confirmation information for executing the second configuration information is sent" may include: when the confirmation information for executing the second configuration information is being sent, before the confirmation information for executing the second configuration information is sent, or after the confirmation information for executing the second configuration information is sent. The foregoing "when confirmation information for executing the first configuration information is sent" may include: when the confirmation information for executing the first configuration information is being sent, before the confirmation information for executing the first configuration information is sent, or after the confirmation information for executing the first configuration information is sent.

According to the determining method provided in this embodiment of the present disclosure, due to arrangement of the first timer, the terminal device can determine, when the first timer expires, that the dual-connectivity moving process of the terminal device fails, so that the terminal device can promptly resolve a connection failure problem of the terminal device. Thus, communication efficiency is improved.

Optionally, in this embodiment of the present disclosure, the foregoing "the dual-connectivity moving process fails" at least includes: a connection between the terminal device and the source cell and/or the target cell fails. For example, the determining method further includes one of the following steps:

Step B1: The terminal device performs a first operation if it detects, within a first time period or a second time period, that a connection failure occurs between the terminal device and the source cell or the target cell; or Step B2: The terminal device performs a second operation if it detects, within a first time period or a second time period, that connection failures occur between the terminal device and the source cell and between the terminal device and the target cell.

The first time period is a time period corresponding to a run period of the first timer.

The second time period is a period from a moment the first timer stops timing to a moment the dual-connectivity moving process is completed.

The first operation includes: triggering a wireless connection re-establishment process, or sending first connection failure information to a network device instead of triggering the wireless connection re-establishment process; and the second operation includes: triggering the wireless connection re-establishment process, or sending second connection failure information to the network device for an SCG change process in the dual-connectivity moving process.

For example, if the terminal device performs connection failure detection in the run period of the first timer, a connection between the terminal device and the source cell and/or that between the terminal device and the target cell may fail. In this case, the terminal device performs any of the following connection failure processing behavior (namely, processing behavior after a failure):

(1) When the connection between the terminal device and the source cell (or the connection between the terminal device and the target cell) fails, the terminal device performs any of the following behavior:

I: Triggering a wireless connection re-establishment process.

II. Directly sending first connection failure information to a network side without triggering the wireless connection re-establishment process.

Example 1: For the handover process, the terminal device reports failure information of the source connection to the network side via the connection to the target cell. Example 2: For the handover process, the terminal device reports failure information of the target connection to the network side via the connection to the source cell. Example 3: For the SCG change process, the terminal device reports the failure information to the network side via the connection to the MCG.

Example 4: For the SCG change process, the terminal device reports failure information of the source connection to the network side via the connection to the target cell.

Example 5: For the SCG change process, the terminal device reports failure information of the target connection to the network side via the connection to the source cell.

(2) When the connection between the terminal device and the source cell and that between the terminal device and the target cell fail, the terminal device performs any of the following behavior: triggering the wireless connection re-establishment process; or for the SCG change process, triggering, by UE, reporting of SCG failure information. In addition, the terminal device may also report failure information to the network side.

Optionally, in this embodiment of the present disclosure, after step 201, that is, after the dual-connectivity moving process fails (for example, t304 expires), the terminal device may further report failure information of the dual-connectivity moving process to the network side. For example, the method further includes the following step:

Step C1: The terminal device sends third connection failure information to a network device.

Correspondingly, a peer-end network device receives the third connection failure information from the terminal device.

For example, the first connection failure information includes: an identifier of the terminal device, first information, geographical location information of the terminal device, and measurement information of the terminal device; and the first information is used to indicate a type of a connection failure.

For example, the second connection failure information includes at least one of the following: the identifier of the terminal device, second information, the geographical location information of the terminal device, or the measurement information of the terminal device; and the second information is used to indicate a type of a connection failure.

For example, the third connection failure information includes: the identifier of the terminal device, third information, the geographical location information of the terminal device, and the measurement information of the terminal device; and the third information is used to indicate a type of a connection failure.

In addition, the first connection failure information, the second connection failure information and the third connection failure information may further include: fifth information. The fifth information is information used to indicate that the dual-connectivity moving process fails, for example, indicating that the handover process fails, or indicating that the SCG change process fails.

In this case, after receiving the connection failure information, the network device may further send the received connection failure information to another network device. For example, a source gNB1 that receives the information sends the information to a target gNB2 corresponding to the handover process. Alternatively, a target gNB2 that receives the information sends the information to a source gNB1 corresponding to the handover process.

For example, the geographical location information includes at least one of the following: cell identifier information (for example, a physical cell identifier (PCI), a cell global identifier (CGI), and a frequency) of the terminal device, cell group identifier information (for example, MCG and/or SCG) of the terminal device, or coordinate location information (for example, global positioning system (GPS) coordinates) of the terminal device.

For example, the measurement information includes at least one of the following:
measurement information of a serving cell or a serving frequency (for example, measurement information of a serving cell for a serving frequency 1);
measurement information of a neighboring cell or a neighboring frequency (for example, measurement information of a neighboring cell 1 or a neighboring frequency 1);
measurement information of a reference signal corresponding to a serving cell or a serving frequency;
measurement information of a reference signal corresponding to a neighboring cell or a neighboring frequency (for example, measurement information of a synchronizing signal block (SSB) 1 or a channel state information—reference signal (CSI-RS) 1 of a cell 1);
an identifier (for example, SSB1) of a reference signal corresponding to a random access resource of a failed random access process;
measurement information (for example, reference symbol received power (RSRP) and reference signal received quality (RSRQ) of the SSB1) of the reference signal corresponding to the random access resource of the failed random access process;
an identifier of a reference signal exceeding a second threshold; or
a quantity of identifiers of a reference signal that exceed the second threshold (for example, an RSRP threshold value for an SSB configured on the network side is −20 dBm, and a quantity of identifiers of SSBs that exceed the threshold value is 2 (for example, the SSB1 and an SSB2)).

The type of the detected connection failure corresponding to the connection failure detection includes at least one of the following: a physical layer is out of synchronization (for example, the timer t310 expires), a random access fails (for example, the maximum quantity of random access attempts is reached), a radio link control (RLC) layer reaches the maximum quantity of retransmission times (for example, the maximum quantity of retransmission times of the maximum RLC layer is reached), a beam fails (for example, a beam recovery process fails), a radio resource control (RRC) connection configuration fails (for example, an RRC connection re-configuration message received by the terminal device exceeds a capability of the terminal device, or the terminal device fails to identify the RRC configuration message), integrity detection fails (for example, integrity detection corresponding to data or control information received by the terminal device fails to be passed), or the maximum uplink transmission timing difference (for example, a difference between boundaries of sub-frames in uplink transmission between the MCG and the SCG when a network configures synchronous dual connectivity) is exceeded.

The foregoing second threshold is a preconfigured threshold value used in reference signal selection. The foregoing reference information includes at least one of the following: an SSB or a CSI-RS.

The foregoing measurement information includes at least one of the following: RSRP, RSRQ, a received signal strength indicator (RSSI), a channel busy ratio (CBR), or a channel occupancy ratio (CR).

The foregoing identifier of the terminal device includes at least one of the following: an international mobile subscriber identity (IMSI), a temporary mobile subscriber identity (TMSI), an S-TMSI (system architecture evolution (SAE) TMSI), a 5G-S-TMSI, or a radio network temporary identity (RNTI).

Optionally, in this embodiment of the present disclosure, in the first time period (namely, the run period of the first timer), the determining method further includes the following step:

Step D1: The terminal device performs, within the first time period, corresponding connection failure detection on a connection between the terminal device and a first cell; or skips performing corresponding connection failure detection on a connection between the terminal device and a first cell.

The first time period is a run period of the first timer; and the first cell includes a source cell and/or a target cell.

In this embodiment of the present disclosure, in the run period of the first timer, the connection between the terminal device and the source cell and/or the target cell may fail. In this case, connection failure detection behavior (namely, a manner of executing connection failure detection) of the terminal device includes:

(1) For the connection between the terminal device and the source cell and/or the target cell, the terminal device performs connection failure detection corresponding to the connection in the first time period.

(2) For the connection between the terminal device and the source cell and/or the target cell, the terminal device skips performing connection failure detection corresponding to the connection in the first time period.

Further optionally, in this embodiment of the present disclosure, for the target cell, if corresponding connection failure detection is not performed on the connection between the terminal device and the target cell within the first time period, perform the corresponding connection failure detection on the connection between the terminal device and the target cell after the dual-connectivity moving process is completed. In other words, if the terminal device skips performing connection failure detection corresponding to the connection to the target cell within the first time period, the terminal device resumes performing connection failure detection on the target connection after the dual-connectivity moving process is completed successfully. For example, the terminal device resumes performing connection failure detection corresponding to the target connection after confirmation information for executing the second configuration information is sent.

Optionally, in this embodiment of the present disclosure, in the second time period (namely, the period from the moment the first timer stops timing to the moment the dual-connectivity moving process is completed), the determining method further includes the following step:

Step D2: The terminal device skips performing corresponding connection failure detection on a connection between the terminal device and a first cell within a second time period; or if the corresponding connection failure detection is not performed on the connection between the terminal device and the first cell before the first timer stops timing, performs the corresponding connection failure detection on the connection between the terminal device and the first cell within the second time period.

In this embodiment of the present disclosure, if the first timer stops before the dual-connectivity moving process is completed (for example, the terminal device starts the first timer when receiving (or executing) the first configuration information) (t1 in FIG. 3), and stops the timer when the random access process to the target cell is completed (for example, the random access is completed) (t2 in FIG. 3), but the dual-connectivity moving process of the terminal device stops after the confirmation information for executing the second configuration information is sent (t4 in FIG. 3), in the period from the moment the first timer stops to the moment the dual-connectivity moving process is completed successfully (namely, the foregoing second time period), the connection between the terminal device and the source cell and/or that between the terminal device and the target cell may fail. In this case, the connection failure detection behavior (namely, a manner of executing connection failure detection) of the terminal device includes:

(1) For the connection between the terminal device and the source cell and/or the target cell, the terminal device skips performing connection failure detection corresponding to the connection in the second time period.

(2) If the terminal device skips performing connection failure detection corresponding to the connection to the source cell before the second time period, the terminal device resumes performing connection failure detection on the connection within the second time period. For example, the terminal device skips performing connection failure detection corresponding to the connection to the source cell before the random access is completed; and after the random access is completed, the terminal device resumes performing on the connection failure detection for the source cell.

(3) If the terminal device skips performing connection failure detection corresponding to the connection to the target cell before the second time period, the terminal device resumes performing connection failure detection on the connection within the second time period. For example, the terminal device skips performing connection failure detection corresponding to the connection to the target cell before the random access is completed; and after the random access is completed, the terminal device resumes performing on the connection failure detection for the target cell.

Further optionally, in this embodiment of the present disclosure, for the target cell, if corresponding connection failure detection is not performed on the connection between the terminal device and the target cell within the second time period, perform the corresponding connection failure detection on the connection between the terminal device and the target cell after the dual-connectivity moving process is completed. In other words, if the terminal device skips performing connection failure detection corresponding to the connection to the target cell within the second time period, the terminal device resumes performing connection failure detection on the target connection after the dual-connectivity moving process is completed successfully. For example, the terminal device resumes performing connection failure detection corresponding to the target connection after confirmation information for executing the second configuration information is sent.

Further optionally, in this embodiment of the present disclosure, skipping performing corresponding connection failure detection on a connection between the terminal device and a first cell includes any one of the following:

for connection failure detection (namely, radio link monitoring (RLM)) performed when a physical layer is out of synchronization, skipping, by the terminal device, starting a second timer (for example, the terminal device skips starting t310 after receiving information used to indicate that a plurality of consecutive physical layers are out of synchronization), where the second timer is configured to monitor whether the physical layer is out of synchronization;

for the connection failure detection performed when the physical layer is out of synchronization, skipping, by the terminal device, counting fourth information, where the fourth information is used to indicate that the physical layer is out of synchronization, that is, the terminal device does not count information used to indicate that the physical layer is out of synchronization (namely, the fourth information);

for the connection failure detection performed when the physical layer is out of synchronization, skipping, by the terminal device, measuring a measurement signal corresponding to RLM;

for the connection failure detection performed when the physical layer is out of synchronization, skipping, by the terminal device after the second timer expires, triggering connection re-establishment;

for connection failure detection performed when a random access fails, skipping, by the terminal device, recording a quantity of attempts of the random access;

for the connection failure detection performed when the random access fails, skipping, by the terminal device, triggering connection re-establishment when determining that the maximum quantity of attempts of the random access is reached (or for SCG change, the terminal device skips triggering SCG failure report);

for connection failure detection performed when the maximum quantity of retransmission times of an RLC layer is not reached, skipping recording a quantity of retransmission times of the RLC layer;

for the connection failure detection performed when the maximum quantity of retransmission times of the RLC layer is not reached, skipping, by the terminal device, triggering connection re-establishment after determining that the maximum quantity of retransmission times is reached; or, for SCG change, skipping, by the terminal device, triggering SCG failure report;

for connection failure detection performed when a beam failure occurs, skipping, by the terminal device, measuring a measurement signal corresponding to beam failure detection;

for the connection failure detection performed when the beam failure occurs, skipping, by the terminal device, recording a quantity of attempts to recover a random access process after the beam failure;

for the connection failure detection performed when the beam failure occurs, skipping, by the terminal device after it determines that a first random access process reaches the maximum quantity of random access attempts, triggering connection re-establishment; or, for SCG change, skipping, by the terminal device, triggering an SCG reporting process, where the first random access process is a random access process recovered after the beam failure;

for connection failure detection performed when RRC connection configuration fails, skipping, by the terminal device after an RRC configuration message fails to be configured, triggering a connection re-establishment process;

for connection failure detection performed when integrity detection fails, skipping, by the terminal device after the integrity detection fails, triggering the connection re-establishment process;

for the connection failure detection performed when the integrity detection fails, skipping, by the terminal device, performing integrity detection on received information; or, for SCG change, skipping, by the terminal device after the integrity detection fails, triggering SCG failure reporting;

for connection failure detection performed when the maximum uplink transmission timing difference is exceeded, skipping, by the terminal device, measuring whether the maximum uplink transmission timing difference is exceeded; and for the connection failure detection performed when the maximum uplink transmission timing difference is exceeded, skipping, by the terminal device when the maximum uplink transmission timing difference is exceeded, triggering a connection re-establishment process.

According to the determining method provided in this embodiment of the present disclosure, after determining, via the first timer, that the dual-connectivity moving process of the terminal device fails, the terminal device can process a corresponding connection failure in the run period of the first timer or the period from the moment the first timer stops timing to the moment the dual-connectivity moving process is completed. Thus, communication efficiency is improved.

FIG. 4 is a possible schematic structural diagram of a terminal device according to an embodiment of the present disclosure. As shown in FIG. 4, the terminal device 400 includes a determining module 401.

The determining module 401 is configured to: determine, when a first timer expires, that a dual-connectivity moving process of the terminal device 400 fails.

Optionally, the dual-connectivity moving process includes at least one of the following: a handover process or an SCG change process; the handover process includes at least one of the following: a first process, a second process, and a third process; the SCG change process includes at least one of the following: the first process, a fourth process, or a fifth process; and the first process is a connection process in which the terminal device 400 establishes connections to a source cell and a target cell at a time; the second process is a change process in which the target cell is changed to an MCG; the third process is a change process in which the source cell is changed to an SCG or the source cell is released; the fourth process is a change process in which the target cell is changed to an SCG; and the fifth process is a change process in which the source cell is released.

Optionally, with reference to FIG. 4, as shown in FIG. 5, the terminal device 400 further includes a starting module 402.

The starting module 402 is configured to start the first timer according to a first predetermined condition, where the first predetermined condition includes any one of the following: the starting is performed when first configuration information is received, the starting is performed when the first configuration information is executed, the starting is performed when second configuration information is received, and the starting is performed when the second configuration information is executed; and the second configuration information is applied to at least one of the following: the second process, the third process, the fourth process, or the fifth process.

Optionally, with reference to FIG. 4, as shown in FIG. 5, the terminal device 400 further includes a control module 403.

The control module 403 is configured to control, according to a second predetermined condition, the first timer to stop timing, where the second predetermined condition includes any one of the following: the timing is stopped after a random access process to the target cell is completed, the timing is stopped after a source connection is released, the timing is stopped when the second configuration information is received, the timing is stopped when the second configuration information is executed, the timing is stopped when the second process and/or the fourth process are/is completed, the timing is stopped when confirmation information for executing the second configuration information is sent, and the timing is stopped when confirmation information for executing the first configuration information is sent; and the second configuration information is applied to at least one of the following: the second process, the third process, the fourth process, or the fifth process.

Optionally, with reference to FIG. 4, as shown in FIG. 5, the terminal device 400 further includes an execution module 404.

The execution module 404 is configured to: perform a first operation if it is detected, within a first time period or a second time period, that a connection failure occurs between the terminal device and the source cell or the target cell; or, perform a second operation if it is detected, within the first time period or the second time period, that a connection failure occurs between the terminal device and the source cell and between the terminal device and the target cell the target cell, where the first time period is a run period of the first timer; the second time period is a period from a moment the first timer stops timing to a moment the dual-connectivity moving process is completed; the first operation includes: triggering a wireless connection re-establishment process, or sending first connection failure information to a network device instead of triggering the wireless connection re-establishment process; and the second operation includes: triggering the wireless connection re-establishment process, or sending second connection failure information to the network device for an SCG change process in the dual-connectivity moving process.

Optionally, the first connection failure information includes at least one of the following: an identifier of the terminal device 400, first information, geographical location information of the terminal device 400, or measurement information of the terminal device 400; and the first information is used to indicate a type of a connection failure. The second connection failure information includes at least one of the following: the identifier of the terminal device 400, second information, the geographical location information of the terminal device 400, or the measurement information of the terminal device 400; and the second information is used to indicate a type of a connection failure.

Optionally, with reference to FIG. 4, as shown in FIG. 5, the terminal device 400 further includes a sending module 405.

The sending module 405 is configured to send third connection failure information to a network device.

Optionally, the third connection failure information includes at least one of the following: an identifier of the terminal device 400, third information, geographical location information of the terminal device 400, or measurement information of the terminal device 400; and the third information is used to indicate a type of a connection failure.

Optionally, the geographical location information includes at least one of the following: cell identifier information of the terminal device 400, cell group identifier information of the terminal device 400, or coordinate location information of the terminal device 400; and the measurement information includes at least one of the following: measurement information of a serving cell or a serving frequency, measurement information of a neighboring cell or a neighboring frequency, measurement information of a reference signal corresponding to the serving cell or the serving frequency, measurement information of a reference signal corresponding to the neighboring cell or the neighboring frequency, an identifier of a reference signal corresponding to a random access resource of a failed random access process, measurement information of the reference signal corresponding to the random access resource of the failed random access process, an identifier of a reference signal exceeding a second threshold, or a quantity of identifiers of reference signals exceeding the second threshold; and the second threshold is a pre-configured threshold for reference signal selection.

Optionally, the execution module 404 is configured to: within a first time period, perform corresponding connection failure detection on a connection between the terminal device 400 and a first cell, or skip performing the corresponding connection failure detection on the connection between the terminal device 400 and the first cell, where the first time period is a run period of the first timer, and the first cell includes a source cell and/or a target cell.

Optionally, the execution module 404 is specifically configured to: if corresponding connection failure detection is not performed on a connection between the terminal device 400 and the target cell within the first time period, perform the corresponding connection failure detection on the connection between the terminal device 400 and the target cell after the dual-connectivity moving process is completed.

Optionally, the execution module 404 is configured to: if the first timer stops timing before the dual-connectivity moving process is completed, skip performing corresponding connection failure detection on a connection between the terminal device 400 and a first cell within a second time period; or if the corresponding connection failure detection is not performed on the connection between the terminal device 400 and the first cell before the first timer stops timing, perform the corresponding connection failure detection on the connection between the terminal device 400 and the first cell within the second time period, where the second time period is a period from a moment the first timer stops timing to a moment the dual-connectivity moving process is completed, and the first cell includes a source cell and/or a target cell.

Optionally, the execution module 404 is specifically configured to: if the corresponding connection failure detection is not performed on the connection between the terminal device 400 and the target cell within the second time period, perform the corresponding connection failure detection on the connection between the terminal device 400 and the target cell after the dual-connectivity moving process is completed.

Optionally, skipping performing corresponding connection failure detection on a connection between the terminal device and a first cell includes at least one of the following:
  for connection failure detection performed when a physical layer is out of synchronization, skipping, by the terminal device 400, starting a second timer, where the second timer is configured to monitor whether the physical layer is out of synchronization;
  for the connection failure detection performed when the physical layer is out of synchronization, skipping, by the terminal device 400, counting fourth information, where the fourth information is used to indicate that the physical layer is out of synchronization;
  for the connection failure detection performed when the physical layer is out of synchronization, skipping, by the terminal device 400, measuring a measurement signal corresponding to RLM;
  for the connection failure detection performed when the physical layer is out of synchronization, skipping, by the terminal device 400 after the second timer expires, triggering connection re-establishment;

for connection failure detection performed when a random access fails, skipping, by the terminal device 400, recording a quantity of attempts of the random access;

for the connection failure detection performed when the random access fails, skipping, by the terminal device 400 when it determines that the maximum quantity of attempts of the random access is reached, triggering connection re-establishment;

for connection failure detection performed when the maximum quantity of retransmission times of an RLC layer is not reached, skipping, by the terminal device 400, recording a quantity of retransmission times of the RLC layer;

for the connection failure detection performed when the maximum quantity of retransmission times of the RLC layer is not reached, skipping, by the terminal device 400 after it determines that the maximum quantity of retransmission times is reached, triggering connection re-establishment;

for connection failure detection performed when a beam failure occurs, skipping, by the terminal device 400, measuring a measurement signal corresponding to beam failure detection;

for the connection failure detection performed when the beam failure occurs, skipping, by the terminal device 400, recording a quantity of attempts to recover a random access process after the beam failure;

for the connection failure detection performed when the beam failure occurs, skipping, by the terminal device 400 after it determines that a first random access process reaches the maximum quantity of random access attempts, triggering connection re-establishment, where the first random access process is a random access process recovered after the beam failure;

for connection failure detection performed when RRC connection configuration fails, skipping, by the terminal device 400 after an RRC configuration message fails to be configured, triggering a connection re-establishment process;

for connection failure detection performed when integrity detection fails, skipping, by the terminal device 400 after the integrity detection fails, triggering the connection re-establishment process;

for the connection failure detection performed when the integrity detection fails, skipping, by the terminal device 400, performing integrity detection on received information;

for connection failure detection performed when the maximum uplink transmission timing difference is exceeded, skipping, by the terminal device 400, measuring whether the maximum uplink transmission timing difference is exceeded; or for the connection failure detection performed when the maximum uplink transmission timing difference is exceeded, skipping, by the terminal device 400 when the maximum uplink transmission timing difference is exceeded, triggering a connection re-establishment process.

According to the terminal device provided in the embodiments of the present disclosure, due to arrangement of the first timer, the terminal device can determine, when the first timer expires, that the dual-connectivity moving process of the terminal device fails, so that the terminal device can process a corresponding connection failure in the run period of the first timer or the period from the moment the first timer stops timing to the moment the dual-connectivity moving process is completed. Thus, communication efficiency is improved.

The terminal device provided in this embodiment of the present disclosure can implement the process in the foregoing method embodiment. To avoid repetition, details are not described herein again.

Figure 6:
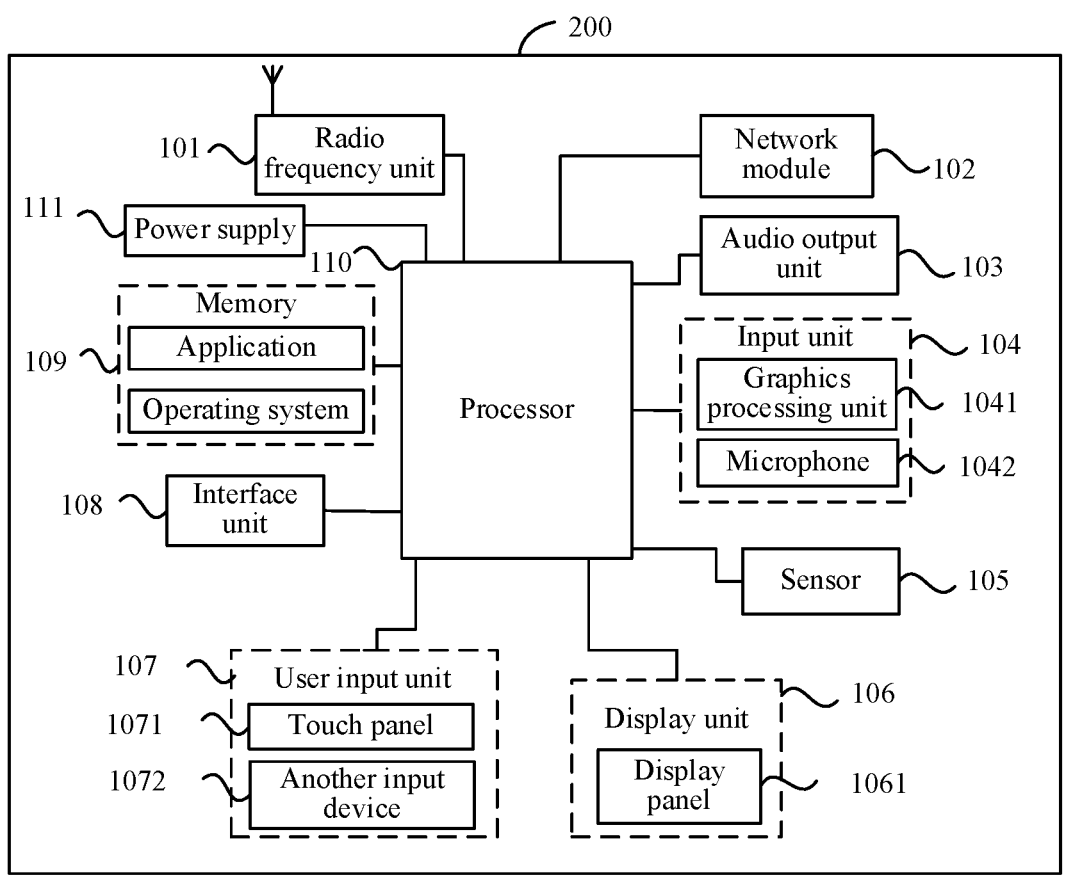
FIG. 6 is a third schematic structural diagram of a terminal device according to an embodiment of the present disclosure.

FIG. 6 is a schematic structural diagram of hardware of a terminal device implementing the embodiments of the present disclosure. The terminal device 200 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. A person skilled in the art may understand that a structure of the terminal device 200 shown in FIG. 6 does not constitute a limitation on the terminal device, and the terminal device 200 may include more or fewer components than those shown in the figure, or combine some components, or have different component arrangements. In this embodiment of the present disclosure, the terminal device 200 includes but is not limited to a mobile phone, a tablet computer, a laptop computer, a palmtop computer, an in-vehicle terminal device, a wearable device, a pedometer, and the like.

The processor 110 is configured to: determine, when a first timer expires, that a dual-connectivity moving process of the terminal device 400 fails.

According to the terminal device provided in the embodiments of the present disclosure, due to arrangement of the first timer, the terminal device can determine, when the first timer expires, that the dual-connectivity moving process of the terminal device fails, so that the terminal device can promptly resolve a connection failure problem of the terminal device. Thus, communication efficiency is improved.

It should be understood that in this embodiment of the present disclosure, the radio frequency unit 101 may be configured to receive and transmit information, or receive and transmit signals during a call. Specifically, the radio frequency unit 101 receives downlink data from a base station, and transmits the downlink data to the processor 110 for processing; and in addition, transmits uplink data to the base station. Generally, the radio frequency unit 101 includes but is not limited to: an antenna, at least one amplifier, a transceiver, a coupler, a low noise amplifier, a duplexer, and the like. In addition, the radio frequency unit 101 may also communicate with another communications device through a wireless communication system and network.

The terminal device 200 provides a user with wireless broadband Internet access through the network module 102, for example, helping the user to send and receive an e-mail, browse a web page, and access streaming media.

The audio output unit 103 may convert audio data received by the radio frequency unit 101 or the network module 102 or stored in the memory 109 into an audio signal, and output the audio signal as sound. Moreover, the audio output unit 103 may further provide audio output (for example, call signal receiving sound and message receiving sound) related to a specific function performed by the terminal device 200. The audio output unit 103 includes a speaker, a buzzer, a telephone receiver, and the like.

The input unit 104 is configured to receive an audio or video signal. The input unit 104 may include a graphics processing unit (GPU) 1041 and a microphone 1042, and the graphics processing unit 1041 processes image data of a still picture or video obtained by an image capture device (for example, a camera) in a video capture mode or an image capture mode. A processed image frame may be displayed on the display unit 106. The image frame processed by the graphics processing unit 1041 may be stored in the memory 109 (or another storage medium) or sent via the radio frequency unit 101 or the network module 102. The microphone 1042 may receive a sound and can process such a sound into audio data. The processed audio data may be converted, in a call mode, into a format that may be sent to a mobile communication base station by using the radio frequency unit 101 for output.

The terminal device 200 further includes at least one sensor 105, such as an optical sensor, a motion sensor, and other sensors. Specifically, the optical sensor includes an ambient optical sensor and a proximity sensor. The ambient optical sensor may adjust luminance of the display panel 1061 based on brightness of ambient light. The proximity sensor may turn off the display panel 1061 and/or backlight when the terminal device 200 approaches an ear. As a type of the motion sensor, an accelerometer sensor may detect an acceleration in each direction (generally, three axes), and detect a value and a direction of gravity when the accelerometer sensor is static, and may be used to recognize a terminal device posture (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, and an infrared sensor. Details are not described herein.

The display unit 106 is configured to display information input by the user or information provided to the user. The display unit 106 may include a display panel 1061, and the display panel 1061 may be configured in a form of a liquid crystal display (LCD), an organic light-emitting diode (OLED), or the like.

The user input unit 107 may be configured to receive input numeral or character information, and generate key signal input related to user setting and function control of the terminal device 200. Specifically, the user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, sends the point coordinates to the processor 110, and receives and executes a command sent by the processor 110. In addition, the touch panel 1071 may be of a resistive type, a capacitive type, an infrared type, a surface acoustic wave type, or the like. In addition to the touch panel 1071, the user input unit 107 may further include other input devices 1072. Specifically, the other input devices 1072 may include but are not limited to a physical keyboard, a functional key (such as a volume control key or a power on/off key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. In FIG. 6, the touch panel 1071 and the display panel 1061 are used as two independent components to implement input and output functions of the terminal device 200. However, in some embodiments, the touch panel 1071 and the display panel 1061 may be integrated to implement the input and output functions of the terminal device 200. This is not specifically limited herein.

The interface unit 108 is an interface for connecting an external apparatus to the terminal device 200. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to receive an input (for example, data information and power) from the external apparatus and transmit the received input to one or more elements in the terminal device 200, or transmit data between the terminal device 200 and the external apparatus.

The memory 109 may be configured to store a software program and various data. The memory 109 may mainly include a program storage area and a data storage area. The program storage area may store an operating system, an application for at least one function (for example, a sound play function or an image play function), and the like. The data storage area may store data (for example, audio data or an address book) or the like created based on use of the mobile phone. In addition, the memory 109 may include a high-speed random access memory, or may include a non-volatile memory, for example, at least one disk storage device, a flash memory, or another volatile solid-state storage device.

The processor 110 is a control center of the terminal device 200, and connects all the components of the entire terminal device 200 by using various interfaces and lines. By running or executing a software program and/or a module that are/is stored in the memory 109 and by invoking data stored in the memory 109, the processor 110 performs various functions of the terminal device 200 and data processing, to perform overall monitoring on the terminal device 200. The processor 110 may include one or more processing units. Optionally, the processor 110 may be integrated with an application processor and a modem processor. The application processor mainly processes an operating system, a user interface, an application program, and the like, and the modem processor mainly processes wireless communication. It can be understood that the above-mentioned modem processor may not be integrated in the processor 110.

The terminal device 200 may further include the power supply 111 (such as a battery) supplying power to each component. Optionally, the power supply 111 may be logically connected to the processor 110 by using a power management system, so as to implement functions such as charging management, discharging management and power consumption management by using the power management system.

In addition, the terminal device 200 includes some function modules not shown, and details are not described herein.

Optionally, an embodiment of the present disclosure further provides a terminal device, including a processor, a memory, and a computer program that is stored in the memory and that can run on the processor. When the computer program is executed by the processor, the process of the determining method shown in the foregoing embodiments is implemented, and a same technical effect can be achieved. To avoid repetition, details are not described herein.

An embodiment of the present disclosure further provides a computer-readable storage medium. A computer program is stored in the computer-readable storage medium. When being executed by a processor, a plurality of processes of the determining method shown in the foregoing embodiments are implemented, and same technical effects can be achieved. To avoid repetition, details are not described herein. The computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. Without more restrictions, an element defined by a phrase "including a . . . " does not exclude presence of other identical elements in the process, method, article, or apparatus that includes the very element.

According to the foregoing descriptions of the implementations, a person skilled in the art may clearly understand that the method in the foregoing embodiments may be implemented by using software and a required universal hardware platform, or certainly, may be implemented by using hardware. However, in many cases, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the aims of the present disclosure and the protection scope of claims, all of which fall within the protection of the present disclosure.

What is claimed is:

1. A determining method, performed by a terminal device, the method comprising:
   determining, when a first timer expires, that a dual-connectivity moving process of the terminal device fails, wherein the dual-connectivity moving process comprises at least one of the following: a handover process or a Secondary Cell Group (SCG) change process;
   the handover process comprises at least one of the following: a first process, a second process, or a third process; and the SCG change process comprises at least one of the following: the first process, a fourth process, or a fifth process, and
   the first process is a connection process in which the terminal device establishes connections to a source cell and a target cell at a time; the second process is a change process in which the target cell is changed to a Master Cell Group (MCG); the third process is a change process in which the source cell is changed to an SCG or the source cell is released; the fourth process is a change process in which the target cell is changed to an SCG; and the fifth process is a change process in which the source cell is released,
   wherein the determining method further comprises:
   starting the first timer according to a first predetermined condition,
   wherein the first predetermined condition comprises any one of the following: the starting is performed when first configuration information is received, the starting is performed when the first configuration information is executed, the starting is performed when second configuration information is received, and the starting is performed when the second configuration information is executed; the first configuration information is applied to the first process; and the second configuration information is applied to at least one of the following: the second process, the third process, the fourth process, or the fifth process.

2. The method according to claim 1, further comprising:
   controlling, according to a second predetermined condition, the first timer to stop timing, wherein
   the second predetermined condition comprises any one of the following: the timing is stopped after a random access process to the target cell is completed, the timing is stopped after a source connection is released, the timing is stopped when the second configuration information is received, the timing is stopped when the second configuration information is executed, the timing is stopped when the second process or the fourth process are/is completed, the timing is stopped when confirmation information for executing the second configuration information is sent, and the timing is stopped when confirmation information for executing the first configuration information is sent; the first configuration information is applied to the first process; and the second configuration information is applied to at least one of the following: the second process, the third process, the fourth process, or the fifth process.

3. The method according to claim 1, further comprising:
   performing a first operation if it is detected, within a first time period or a second time period, that a connection failure occurs between the terminal device and a source cell or a target cell; or
   performing a second operation if it is detected, within the first time period or the second time period, that connection failures occur between the terminal device and the source cell and between the terminal device and the target cell, wherein
   the first time period is a run period of the first timer; the second time period is a period from a moment the first timer stops timing to a moment the dual-connectivity moving process is completed; the first operation comprises: triggering a wireless connection re-establishment process, or sending first connection failure information to a network device instead of triggering the wireless connection re-establishment process; and the second operation comprises: triggering the wireless connection re-establishment process, or sending second connection failure information to the network device for an SCG change process in the dual-connectivity moving process.

4. The method according to claim 3, wherein the first connection failure information comprises at least one of the following: an identifier of the terminal device, first information, geographical location information of the terminal device, or measurement information of the terminal device; the second connection failure information comprises at least one of the following: the identifier of the terminal device, second information, the geographical location information of the terminal device, or the measurement information of the terminal device; and each of the first information and the second information is used to indicate a type of a connection failure.

5. The method according to claim 4, wherein
the geographical location information comprises at least one of the following: cell identifier information of the terminal device, cell group identifier information of the terminal device, or coordinate location information of the terminal device; and
the measurement information comprises at least one of the following: measurement information of a serving cell or a serving frequency, measurement information of a neighboring cell or a neighboring frequency, measurement information of a reference signal corresponding to the serving cell or the serving frequency, measurement information of a reference signal corresponding to the neighboring cell or the neighboring frequency, an identifier of a reference signal corresponding to a random access resource of a failed random access process, measurement information of the reference signal corresponding to the random access resource of the failed random access process, an identifier of a reference signal exceeding a second threshold, or a quantity of identifiers of reference signals exceeding the second threshold; and the second threshold is a pre-configured threshold for reference signal selection.

6. The method according to claim 1, further comprising:
within a first time period, performing corresponding connection failure detection on a connection between the terminal device and a first cell, or skipping performing the corresponding connection failure detection on the connection between the terminal device and the first cell, wherein
the first time period is a run period of the first timer, and the first cell comprises a source cell or a target cell.

7. The method according to claim 6, wherein performing corresponding connection failure detection on a connection between the terminal device and a first cell comprises:
if corresponding connection failure detection is not performed on a connection between the terminal device and the target cell within the first time period, performing the corresponding connection failure detection on the connection between the terminal device and the target cell after the dual-connectivity moving process is completed.

8. The method according to claim 6, wherein skipping performing corresponding connection failure detection on a connection between the terminal device and a first cell comprises at least one of the following:
for connection failure detection performed when a physical layer is out of synchronization, skipping, by the terminal device, starting a second timer, wherein the second timer is configured to monitor whether the physical layer is out of synchronization;
for the connection failure detection performed when the physical layer is out of synchronization, skipping, by the terminal device, counting fourth information, wherein the fourth information is used to indicate that the physical layer is out of synchronization;
for the connection failure detection performed when the physical layer is out of synchronization, skipping, by the terminal device, measuring a measurement signal corresponding to radio link monitoring RLM;
for the connection failure detection performed when the physical layer is out of synchronization, skipping, by the terminal device after the second timer expires, triggering connection re-establishment;
for connection failure detection performed when a random access fails, skipping, by the terminal device, recording a quantity of attempts of the random access;
for the connection failure detection performed when the random access fails, skipping, by the terminal device when it determines that the maximum quantity of attempts of the random access is reached, triggering connection re-establishment;
for connection failure detection performed when the maximum quantity of retransmission times of a radio link control (RLC) layer is not reached, skipping, by the terminal device, recording a quantity of retransmission times of the RLC layer;
for the connection failure detection performed when the maximum quantity of retransmission times of the RLC layer is not reached, skipping, by the terminal device after it determines that the maximum quantity of retransmission times is reached, triggering connection re-establishment;
for connection failure detection performed when a beam failure occurs, skipping, by the terminal device, measuring a measurement signal corresponding to beam failure detection;
for the connection failure detection performed when the beam failure occurs, skipping, by the terminal device, recording a quantity of attempts to recover a random access process after the beam failure;
for the connection failure detection performed when the beam failure occurs, skipping, by the terminal device after it determines that a first random access process reaches the maximum quantity of random access attempts, triggering connection re-establishment, wherein the first random access process is a random access process recovered after the beam failure;
for connection failure detection performed when radio resource control (RRC) connection configuration fails, skipping, by the terminal device after an RRC configuration message fails to be configured, triggering a connection re-establishment process;
for connection failure detection performed when integrity detection fails, skipping, by the terminal device after the integrity detection fails, triggering the connection re- establishment process;
for the connection failure detection performed when the integrity detection fails, skipping, by the terminal device, performing integrity detection on received information;
for connection failure detection performed when the maximum uplink transmission timing difference is exceeded, skipping, by the terminal device, measuring whether the maximum uplink transmission timing difference is exceeded; or
for the connection failure detection performed when the maximum uplink transmission timing difference is exceeded, skipping, by the terminal device when the maximum uplink transmission timing difference is exceeded, triggering a connection re- establishment process.

9. The method according to claim 1, wherein, if the first timer stops timing before the dual-connectivity moving process is completed, the method further comprises:
   skipping performing corresponding connection failure detection on a connection between the terminal device and a first cell within a second time period; or
   if the corresponding connection failure detection is not performed on the connection between the terminal device and the first cell before the first timer stops timing, performing the corresponding connection failure detection on the connection between the terminal device and the first cell within the second time period, wherein
   the second time period is a period from a moment the first timer stops timing to a moment the dual-connectivity moving process is completed, and the first cell comprises a source cell or a target cell.

10. The method according to claim 9, wherein performing the corresponding connection failure detection on the connection between the terminal device and the first cell comprises:
    if the corresponding connection failure detection is not performed on the connection between the terminal device and the target cell within the second time period, performing the corresponding connection failure detection on the connection between the terminal device and the target cell after the dual-connectivity moving process is completed.

11. The method according to claim 1, wherein, after determining, when a first timer expires, that a dual-connectivity moving process of the terminal device fails, the method further comprises:
    sending third connection failure information to a network device.

12. The method according to claim 11, wherein the third connection failure information comprises at least one of the following: an identifier of the terminal device, third information, geographical location information of the terminal device, or measurement information of the terminal device; and the third information is used to indicate a type of a connection failure.

13. A terminal device, comprising a processor, a memory, and a computer program that is stored in the memory and executable by the processor, wherein the computer program, when executed by the processor, causes the processor to:
    determine, when a first timer expires, that a dual-connectivity moving process of the terminal device fails, wherein the dual-connectivity moving process comprises at least one of the following: a handover process or a Secondary Cell Group (SCG) change process;
    the handover process comprises at least one of the following: a first process, a second process, or a third process; and the SCG change process comprises at least one of the following: the first process, a fourth process, or a fifth process, and
    the first process is a connection process in which the terminal device establishes connections to a source cell and a target cell at a time; the second process is a change process in which the target cell is changed to a Master Cell Group (MCG); the third process is a change process in which the source cell is changed to an SCG or the source cell is released; the fourth process is a change process in which the target cell is changed to an SCG; and the fifth process is a change process in which the source cell is released,
    wherein the computer program, when executed by the processor, further causes the processor to:
    start the first timer according to a first predetermined condition,
    wherein the first predetermined condition comprises any one of the following: the starting is performed when first configuration information is received, the starting is performed when the first configuration information is executed, the starting is performed when second configuration information is received, and the starting is performed when the second configuration information is executed; the first configuration information is applied to the first process; and the second configuration information is applied to at least one of the following: the second process, the third process, the fourth process, or the fifth process.

14. The terminal device according to claim 13, wherein the computer program, when executed by the processor, further causes the processor to:
    control, according to a second predetermined condition, the first timer to stop timing, wherein
    the second predetermined condition comprises any one of the following: the timing is stopped after a random access process to the target cell is completed, the timing is stopped after a source connection is released, the timing is stopped when the second configuration information is received, the timing is stopped when the second configuration information is executed, the timing is stopped when the second process or the fourth process are/is completed, the timing is stopped when confirmation information for executing the second configuration information is sent, and the timing is stopped when confirmation information for executing the first configuration information is sent; the first configuration information is applied to the first process; and the second configuration information is applied to at least one of the following: the second process, the third process, the fourth process, or the fifth process.

15. The terminal device according to claim 13, wherein the computer program, when executed by the processor, further causes the processor to:
    perform a first operation if it is detected, within a first time period or a second time period, that a connection failure occurs between the terminal device and a source cell or a target cell; or
    perform a second operation if it is detected, within the first time period or the second time period, that connection failures occur between the terminal device and the source cell and between the terminal device and the target cell, wherein
    the first time period is a run period of the first timer; the second time period is a period from a moment the first timer stops timing to a moment the dual-connectivity moving process is completed; the first operation comprises: triggering a wireless connection re-establishment process, or sending first connection failure information to a network device instead of triggering the wireless connection re-establishment process; and the second operation comprises: triggering the wireless connection re-establishment process, or sending second connection failure information to the network device for an SCG change process in the dual-connectivity moving process.

16. A non-transitory computer-readable storage medium, storing a computer program that, when executed by a processor, causes the processor to:
- determine, when a first timer expires, that a dual-connectivity moving process of a terminal device fails, wherein the dual-connectivity moving process comprises at least one of the following: a handover process or a Secondary Cell Group (SCG) change process; the handover process comprises at least one of the following: a first process, a second process, or a third process; and the SCG change process comprises at least one of the following: the first process, a fourth process, or a fifth process, and
- the first process is a connection process in which the terminal device establishes connections to a source cell and a target cell at a time; the second process is a change process in which the target cell is changed to a Master Cell Group (MCG); the third process is a change process in which the source cell is changed to an SCG or the source cell is released; the fourth process is a change process in which the target cell is changed to an SCG; and the fifth process is a change process in which the source cell is released,
- wherein the computer program, when executed by the processor, further causes the processor to:
- start the first timer according to a first predetermined condition,
- wherein the first predetermined condition comprises any one of the following: the starting is performed when first configuration information is received, the starting is performed when the first configuration information is executed, the starting is performed when second configuration information is received, and the starting is performed when the second configuration information is executed; the first configuration information is applied to the first process; and the second configuration information is applied to at least one of the following: the second process, the third process, the fourth process, or the fifth process.

17. The non-transitory computer-readable storage medium according to claim 16, wherein the processor is further caused to:
- perform a first operation if it is detected, within a first time period or a second time period, that a connection failure occurs between the terminal device and a source cell or a target cell; or
- perform a second operation if it is detected, within the first time period or the second time period, that connection failures occur between the terminal device and the source cell and between the terminal device and the target cell, wherein
- the first time period is a run period of the first timer; the second time period is a period from a moment the first timer stops timing to a moment the dual-connectivity moving process is completed; the first operation comprises: triggering a wireless connection re-establishment process, or sending first connection failure information to a network device instead of triggering the wireless connection re-establishment process; and the second operation comprises: triggering the wireless connection re-establishment process, or sending second connection failure information to the network device for an SCG change process in the dual-connectivity moving process.

* * * * *